USO05530902A

United States Patent [19]
McRoberts et al.

[11] Patent Number: 5,530,902
[45] Date of Patent: Jun. 25, 1996

[54] DATA PACKET SWITCHING SYSTEM HAVING DMA CONTROLLER, SERVICE ARBITER, BUFFER TYPE MANAGERS, AND BUFFER MANAGERS FOR MANAGING DATA TRANSFER TO PROVIDE LESS PROCESSOR INTERVENTION

[75] Inventors: Louis A. McRoberts, Scottsdale; Kenneth J. Clauss, Chandler, both of Ariz.; Keith Morton, North Reading, Mass.

[73] Assignee: Motorola, Inc., Schaumburg, Ill.

[21] Appl. No.: 75,445

[22] Filed: Jun. 14, 1993

[51] Int. Cl.6 .............................. G06F 13/00; G06F 13/12
[52] U.S. Cl. ...................... 395/848; 395/842; 395/872; 395/728; 370/60; 370/60.1; 370/61; 364/242.3; 364/242.6; 364/243.0; 364/DIG. 1
[58] Field of Search .................... 370/60, 60.1, 61; 395/400, 425, 650, 848, 842, 872, 728

[56] References Cited

U.S. PATENT DOCUMENTS

| | | | |
|---|---|---|---|
| 4,692,917 | 9/1987 | Fujioka | 370/60 |
| 4,704,717 | 11/1987 | King, Jr. | 370/85 |
| 4,725,945 | 2/1988 | Kronstadt et al. | 364/200 |
| 4,879,712 | 11/1989 | Littlewood | 370/60 |
| 4,993,025 | 2/1991 | Vesel et al. | 370/94.1 |
| 5,189,668 | 2/1993 | Takatori et al. | 370/60 |
| 5,218,684 | 6/1993 | Hayes et al. | 395/400 |
| 5,305,446 | 4/1994 | Leach et al. | 395/425 |
| 5,311,509 | 5/1994 | Heddes et al. | 370/60 |
| 5,421,015 | 5/1995 | Khoyi et al. | 395/650 |

Primary Examiner—Thomas C. Lee
Assistant Examiner—Le Hien Luu
Attorney, Agent, or Firm—Frank J. Bogacz

[57] ABSTRACT

A multi-purpose direct memory access packet control system for moving packets within a multi-processor computer system. The data memory is allocated into a number of unique data spaces suitable for storage of packets. Each data space is controlled by a unique type of buffer manager. Different buffer formats such as circular, linear, and offset are provided without the intervention of the processor and its associate software. Data packets are rapidly transmitted from an input buffer to the appropriate section of the memory and vice versa.

16 Claims, 6 Drawing Sheets

FIG. 1

GLOBAL ADDRESS FORMAT

| COMPUTER NUMBER 4 BITS | BUFFER NUMBER 4 BITS | UNUSED 6 BITS | LOCAL OFFSET ADDRESS 10 BITS | ZEROS 8 BITS | DATA 384 BITS |

DATA PACKET SWITCHING SYSTEM HAVING DMA CONTROLLER, SERVICE ARBITER, BUFFER TYPE MANAGERS, AND BUFFER MANAGERS FOR MANAGING DATA TRANSFER TO PROVIDE LESS PROCESSOR INTERVENTION

BACKGROUND OF THE INVENTION

The present invention pertains to high speed data transfer among processors and more particularly to efficient routing, buffering, and storing the data packets by buffer managers.

In modern communication systems, it is required that large amounts of data be transferred from one point to another. These switch points are often computer controlled switching arrangements. Computers can communicate with one another to affect the data transfer from one computer to another. Both computers would be required to effectively dedicate one hundred percent of their real time to affect the transfer. This is ineffective utilization of the computer's processing time since computers are able to transfer data much faster than in a simple data transfer between central processing units.

As a result of having two dedicated processors communicating with one another in real time, other approaches have been utilized to make more efficient use of the processor's real time. Such schemes include direct memory access (DMA) in which one processor directly accesses the memory of another processor and transfers data to the memory suitable for the first processor to directly utilize. While this scheme works well for a few processors communicating with one another, it does not work well for transferring large amounts of data from one processor to another as is done in modern telecommunication systems.

To overcome the problem of the number of processors sending and receiving data in a telecommunication system, for example, packet switching has been adopted. In such switching arrangements, processors send fixed or variable length packets of data smaller than the total amount of data required to be sent back and forth in bursts among the processors. Typically each such packet has a header with information for routing the packet to the appropriate processor. Processors typically monitor the headers to determine which packets are addressed to them and store the appropriate packet data in memory. The problem with this arrangement is that the processor must still monitor on the communication path and examine all packets for a particular address and then provide the ability to store the data into the processor's local memory. As a result, the processor must waste considerable time reading each header and transferring the appropriate packets into its memory. In addition due to the varying kinds of functions to be performed by telecommunication system processors, it is highly desirable to place certain packets of data in certain areas of local memory.

Accordingly, it would be highly desirable for a multiprocessor arrangement to provide a common scheme of buffer management among processors so that data packets may be transferred rapidly and with as little intervention of the processor from a processor to predefined locations of other processor's local memory.

SUMMARY OF THE INVENTION

In accordance with the present invention, a novel method and apparatus for common buffer management among a group of processors is shown.

In a packet data switching system which includes a plurality of processors and a plurality of input/output devices, each of the plurality of processors and input/output devices transmits and receives data packets. The packet data switching system includes a receiver and transmitter for receiving and transmitting the data packets. A memory is coupled to the receiver and transmitter. A processor is coupled to the memory. A DMA controller is also coupled to the memory. The DMA controller controls access to the memory by the processor and by the receiver and transmitter. A plurality of buffer managers are coupled to the DMA controller. Each of the plurality of buffer managers control the storage and retrieval of data packets to and from the memory under control of the DMA controller. A buffer type manager is coupled to each of the plurality of buffer managers and to the DMA controller. The buffer type manager selectively enables each of the plurality of buffer managers for transferring data to and from memory.

A data packet transfer method provides a plurality of distinct types of buffer managers for controlling the transfer of data packets to and from a memory. From information within each data packet, a buffer manager is selected based upon indicated buffer number. A buffer type manager requests control of the memory system. When control of the memory system is granted, the buffer manager transfers data packets to or from the memory based upon parameters included in the selected buffer manager.

BRIEF DESCRIPTION OF THE DRAWINGS

FIG. 1 is a bit layout of a data packet transmitted between processors.

DESCRIPTION OF THE PREFERRED EMBODIMENT

Referring to FIG. 1, a bit map layout of a typical data packet for the present system is shown. Reading from left to right, the first field is the computer number which is 4 bits in length. The computer number is the identity of the destination computer. The next field in the message packet is the buffer number which is also 4 bits in length. The buffer number indicates which buffer manager at the destination computer is to control the incoming data packet. The buffer numbers are preassigned and indicate such buffer treatments as a linear buffer, a circular buffer, a buffer offset provided by the destination computer or an offset buffer with an index address being transmitted within the data packet. The next field in the data packet is an unused data field including six bits. These bits are reserved for future use.

The next field is the local offset address which is 10 bits in length. The local offset address field includes a 10-bit index into a predefined buffer within the destination computer. The next field is a 8-bit field which contains all zero entries. The remaining portion of the data packet is 384 bits of data. The data packet in total comprises 416 bits of which 384 are data bits.

Figure 2:
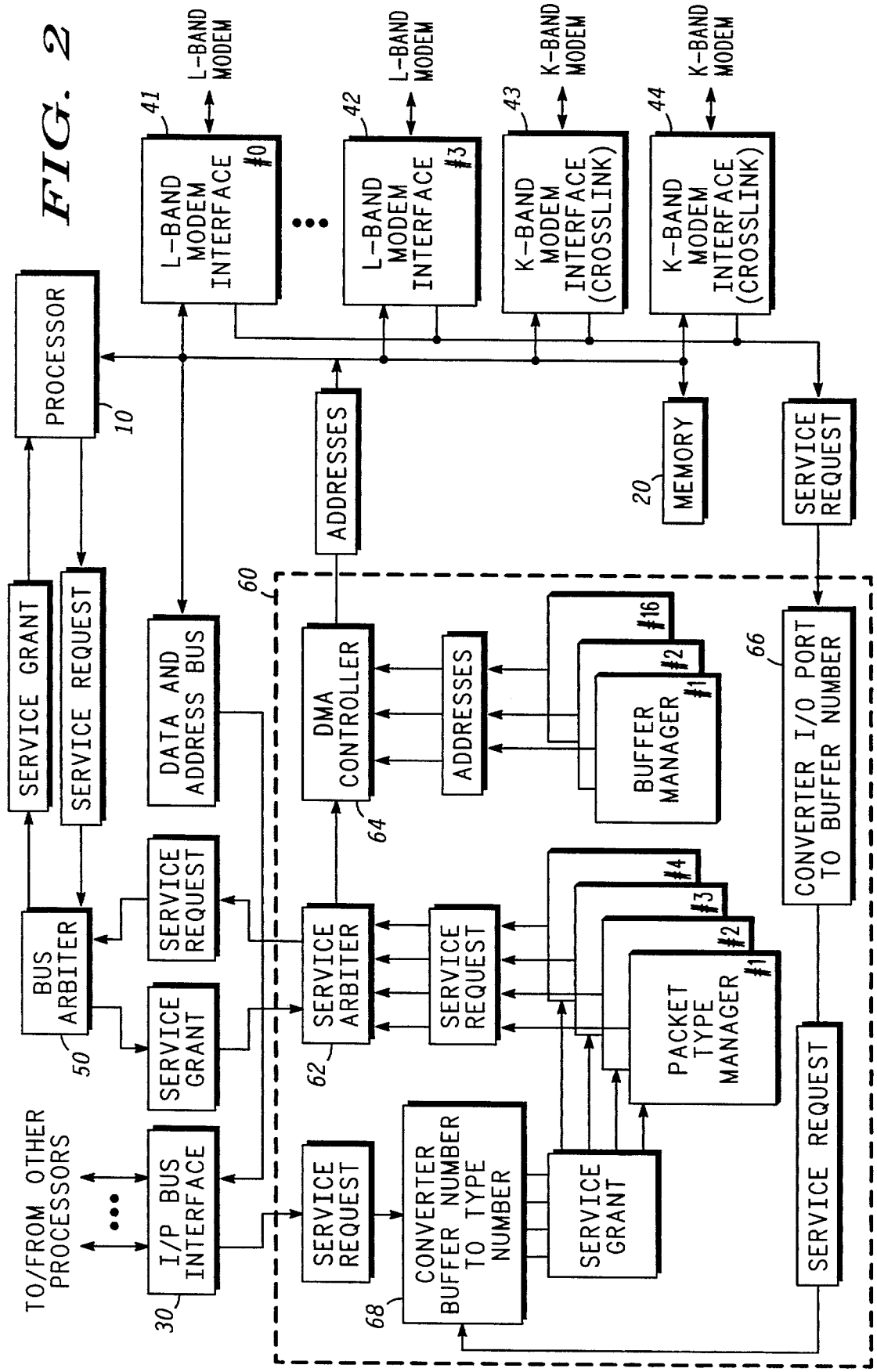
FIG. 2 is a block diagram of the processor system showing service requests.

Referring to FIG. 2 a block diagram of a computer system for data transfer according to the present invention is shown. Processor 10 is coupled to memory 20. Processor 10 may be implemented with a microprocessor which is a 32-bit high-performance microprocessor such as a Motorola 68040, for example. For purposes of the present invention, microprocessors of any bit length capability or processing speed may be used. The key features of such processors are that the processor does not assume that it is the master control of the busses. The selected microprocessor does require control lines such as bus request and bus grant and must be capable of requesting access for bus grant.

I/P bus interface 30 is the interface to the communication link between processor 10 and the other processors. Data packets are received and transmitted via I/P bus interface 30. I/P bus interface 30 is coupled to processor 10, memory 20, and modems 41–44 via the data and address busses. The bus arbiter determines whether the processor 10 or the central routing function 60 will be bus master (in control of the busses). As a result of the operation of the bus arbiter, the processor which is bus master is allowed to transfer data over the data bus. Bus arbiter 50 provides dual-level arbitration so that processor 10 can, if necessary, receive frequent service to speed up loading its cache during a context change. An alternate arrangement for bus arbiter 50 is to treat request for service from processor 10 equally with requests for service from the modem interfaces 41 through 44. In this case, there may be relatively long delays for the processor 10 to load its cache memory (not shown). The result is a decrease in performance of processor 10. Bus arbiter 50 is coupled to processor 10 via service request and service grant leads.

Central routing function 60 includes packet-type managers 1–4 and buffer managers 1–16. Central routing function 60 also includes service arbiter 62 which is coupled to DMA controller 64. Service arbiter 62 is coupled to bus arbiter 50 via service grant and service request leads. Converter 66 converts I/O port number to buffer number. Converter 66 is coupled to modems 41–44 via service request leads.

Converter 66 is coupled to converter 68 via a service request lead. The central routing function 60 includes converter 68 which converts buffer number to type number. Converter 68 is coupled to I/P bus interface 30, converter 66 and packet-type managers 1–4. Converter 68 provides service grants to packet managers 1–4. Packet-type managers 1–4 are coupled to service arbiter 62 via service request leads. Buffer managers 1–16 are coupled to DMA controller 64 via the address bus.

The K-band modem interfaces 43 and 44 provide an interface between processor 10 and K-band modems (not shown). Data which is received via the K-band modem and corresponding interface is processed by the K-band modem interface 43 or 44 and a global address is assigned. Then, the data is stored in a K-band input buffer which is located in memory 20. Two K-band modem interfaces are shown 43 and 44. K-band modem interface 43 provides for interfacing processor 10 with the processors of other satellites, for example. The other K-band modem interface 44 is for facilitating communications between processor 10 and a ground-based earth station termed a gateway. Interfaces 43 and 44 operate similarly except that there are separate buffers for the transmission of data. However, interfaces 43 and 44 do use the same buffer for received data. Each of the interfaces 43 and 44 can generate two service requests. One service request is for received data and permission to store the data in the K-band received buffer in memory 20. The other request is for transmission when the interface requires more data to transmit which is stored in memory 20.

L-band modem interfaces 41 and 42 actually represent up to four L-band modem interfaces. Each of the L-band modems 41 and 42 can serve a number of terrestrial user interfaces. In memory 20, there is space allocated for 512 packets of received data via an uplink and another 512 packets of transmitted data for a downlink. Each of the L-band modem interfaces 41 and 42 can also generate two service requests, one when transmitting data and the other when receiving data. Although the number of data packets has been specified, the memory may be tailored to contain a greater number or a lesser number of data packets.

Figure 3:
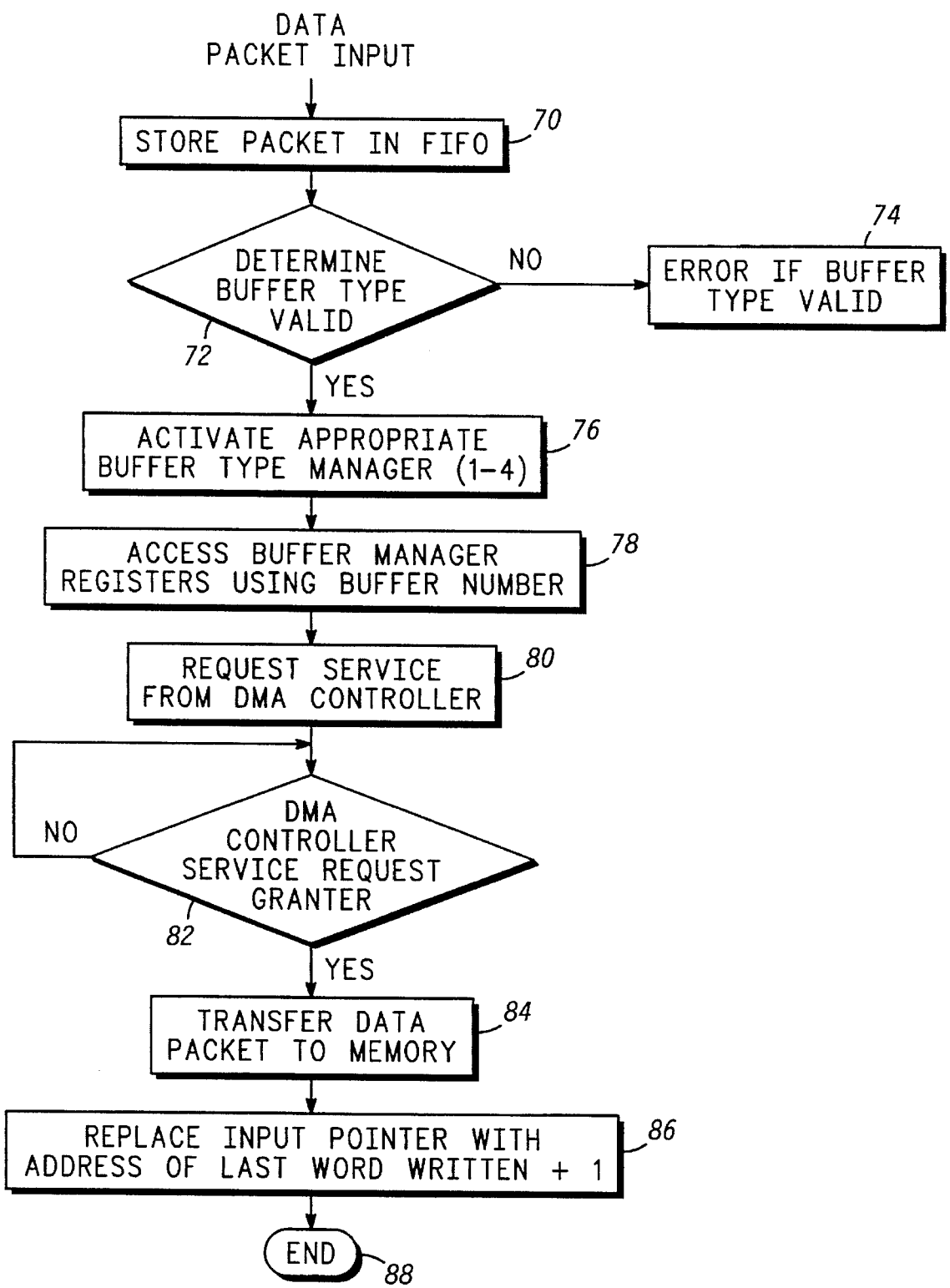
FIG. 3 is a flow chart of the data packet processing and storage process.

Referring to FIG. 3, a flow chart of the process for receiving input data packets from other processors is shown. FIG. 2 should also be read in conjunction with FIG. 3 for a better understanding of this operation. When a data packet is input to I/P bus interface 30, block 70 stores the data packet in a local FIFO (first-in, first-out buffer, not shown). Next, block 72 determines whether the buffer type is valid. I/P bus interface generates a service request to converter 68. Converter 68 converts the buffer number input by another processor to a type number and determines its validity. If the buffer type is invalid, block 72 transfers control to block 74 and an error is generated in the system for an invalid buffer type number. If the buffer type is valid, block 72 transfers control to block 76 via the YES path.

Block 76 activates the appropriate buffer type manager corresponding to the translated buffer type number. These buffer or packet type managers are shown in the central routing function 60 as packet-type managers 1–4. Converter 68 grants service to one of these packet types. The four types of packet or buffer managers provided for this system are: a linear buffer manager; a circular buffer manager; an offset, provided by the receiving computer manager; and an offset, contained in the global address manager. Next, access is made to the buffer manager registers 1–16 shown in FIG. 2 using the buffer number produced by the packet-type managers 1–4, block 78.

The appropriate packet-type manager 1–4 then requests service from service arbiter 62 for the DMA controller 64, block 80. Service arbiter 62 will then request control of the bus from bus arbiter 50. When bus arbiter 50 grants the service request, service arbiter 62 through converter 68 will grant service to one of the packet-type managers 1–4. The packet-type manager will wait for the service request to be granted, block 82. If the service request is not granted, block 82 waits until the service request is granted via the NO path. When the request is granted, block 82 transfers control to block 84 via the YES path. Then the data packet is transferred from the I/P bus interface 30 to memory 20 under control of the DMA controller 64 and the buffer managers 1–16 which have input the appropriate address to DMA controller for storage of the data packet at that address, block 84. Then block 86 replaces the input pointer with the address of the last word written into memory 20 plus an increment of one word. This allows the next incoming data packet not to overlap the previous one. Then the process is ended, block 88.

Figure 4:
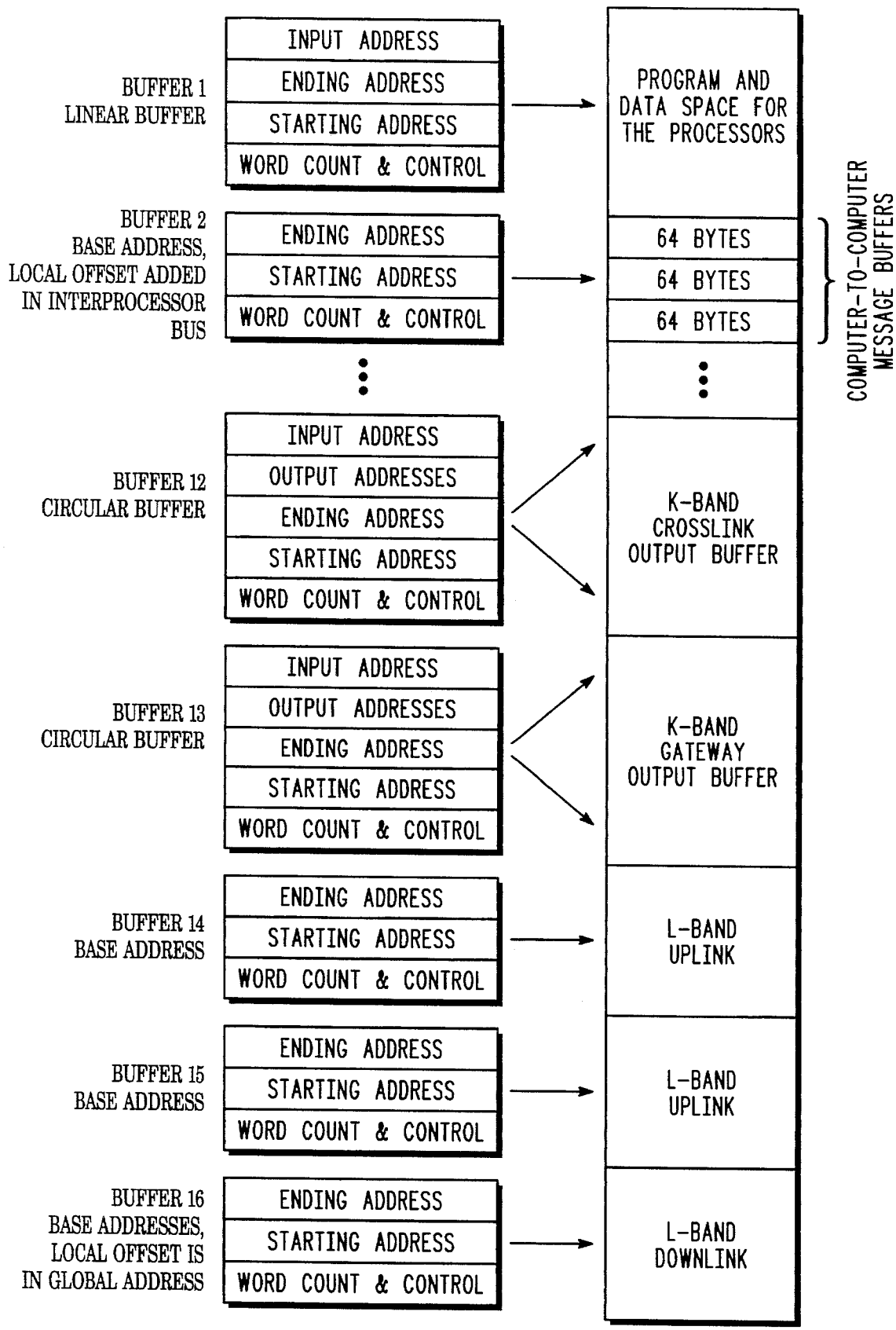
FIG. 4 is a memory layout depicting the structure of the buffer managers.

Referring to FIG. 4, the register arrangement comprising each of the buffer managers 1–16 is shown along with a suitable memory layout of memory 20. The memory layout of memory 20 shown is only one possible configuration; a number of other configurations may serve equally as well for different applications.

Buffer-type 1 shown is a linear buffer. The linear buffer is demonstrated by buffer 1. Buffer 1 includes an input address, an ending address, a starting address, and a word count and control register. Linear buffer 1 stores packets as received in sequential memory locations. The global address is removed by the I/P bus interface 30 and only the data portion comprising 384 bits is transferred to memory 20. The linear buffer manager as shown in buffer 1, for example, is utilized to transfer tables or executable program code from one processor to another with a minimum of intervention by the processors themselves.

The next buffer type is the circular buffer. Buffers 12 and 13 are examples of circular buffers. The current use for the circular buffers is for the transmission of data between the gateway and the processors and data transferred between the cross-link through processors of other satellites and the processors of the present satellite. Each of the circular buffer types includes an input address, output address, ending address, starting address, and bit count and control register. The circular buffer managers store packets as they are received in a circular buffer. The global address is removed by the I/P bus interface 30 and only the data portion is stored in the buffer. These buffers facilitate the transmission of high-speed data between satellites or between a satellite and an earth station, for example.

Buffer-type 3 is an offset, provided by the receiving processor. An example of this type of arrangement is shown by buffer 2. Buffer 2 includes an ending address, a starting address, and a bit count and control register. This arrangement is particularly useful for transmitting short messages in this case 64 bytes, for examples, from computer to computer. The type 3 buffer is a buffer with an offset provided by the receiving processor. The addresses used by this type buffer manager are actually an offset within the range of buffers provided for in memory 20. A fixed length buffer size is used. In the example of FIG. 4, this size is 64 bytes although other sizes appropriate to different functions may be used. As data packets are received, an offset address is read from a list in a FIFO (not shown) and that offset address is added to the starting address of the buffer in memory 20. Then the packet is stored beginning at that starting address. Next, the offset address is stored in a local first-in, first-out memory which is read by the software of processor 10. Each software module knows the offset address where it may expect data packets received from processor-to-processor transfer. After the appropriate software module has processed the data packet, the offset address is returned to the list in the FIFO of offset addresses included in another first-in, first-out memory. The purpose of this type of buffer is to provide a permanent storage for packets so the software modules do not need to move the contents to prevent them from being overwritten by other incoming packets. The size of the memory allocated to processor-to-processor message transfers may be increased or decreased depending upon the amount of this kind of traffic.

Type 4 is the last buffer type which is an offset which is contained in the global address. Buffers 14, 15, and 16 are of this type as shown in FIG. 4. The type 4 buffer includes an ending address, a starting address, and a byte count and control register. The type 4 buffer manager stores data packets at specific locations within the buffer as determined by an offset included as part of the global address (see FIG. 1). The offset included in the global address is added to the starting address of the buffer in packet memory 20. The packet is stored at that starting address.

Figure 5:
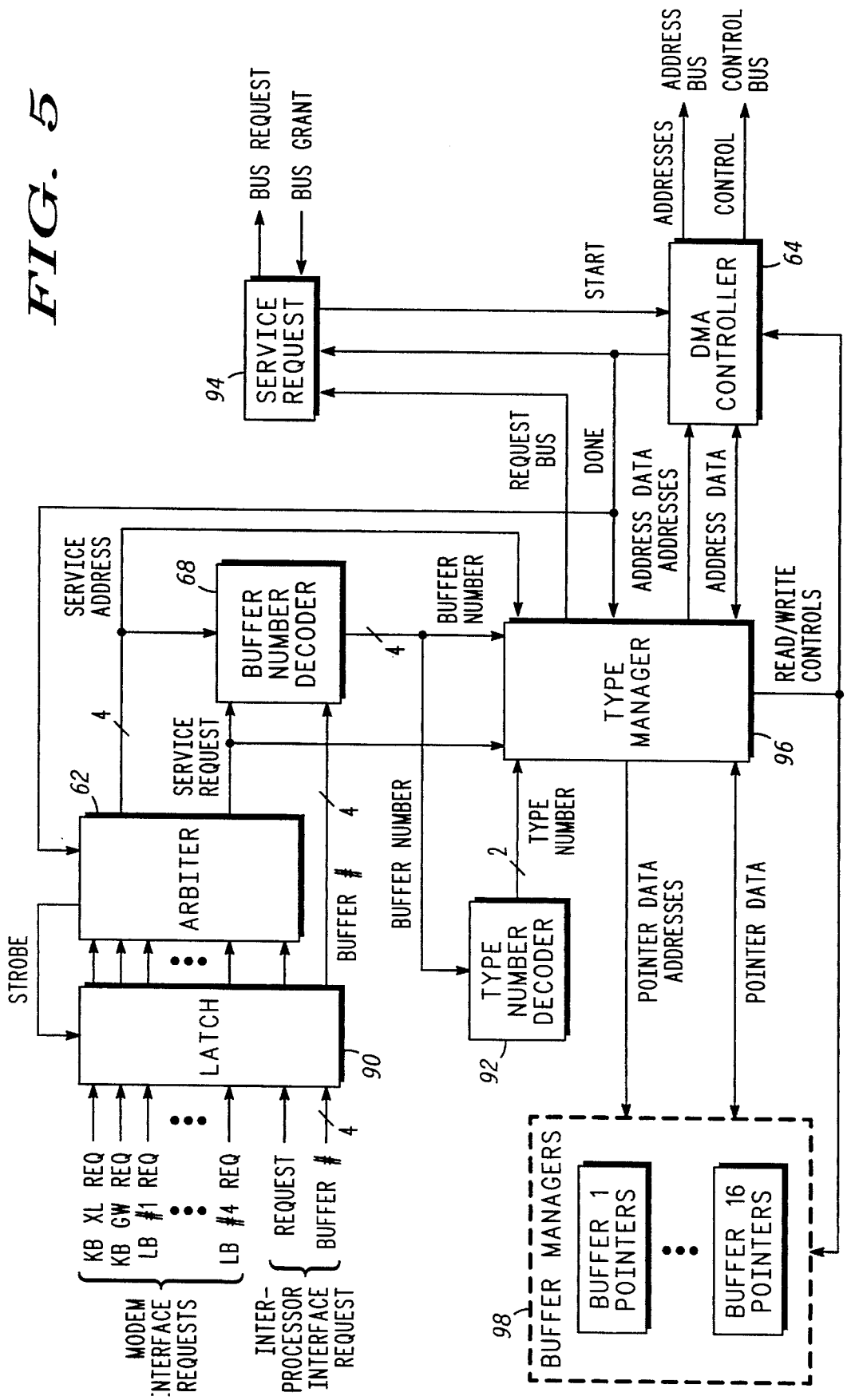
FIG. 5 is a block diagram of the central routing function 60 of FIG. 2.

Referring to FIG. 5 a block diagram of the central routing function 60 of FIG. 2 is shown. Latch 90 is coupled to each of the modem interfaces 41–44. In addition, latch 90 is coupled to each of the other processors within the satellite or switching unit, for example, via the request lead and the buffer number bus. The buffer number bus is a 4-bit data bus. This 4-bit data bus is the computer number as shown in the global address format of FIG. 1. Latch 90 is coupled to arbiter 62. Latch 90 transmits each of the requests for memory access to arbiter 62. Latch 90 transmits the buffer number (computer or processor number) directly to buffer number decoder 68. Arbiter 62 generates a service request which is transmitted to buffer number decoder 68. Arbiter 62 transmits the service address to type manager 96 and to buffer number decoder 68. The service address is the identity of the other processor or modem interface requesting access to transmit a data packet.

Buffer number decoder 68 transmits the buffer number to type number decoder 92 for conversion to the type number (0–3) which is input to type manager 96. Since type manager 96 has a service request to fulfill, it generates a request bus signal which is transmitted to service request 94. Service request 94 generates a bus request signal which is transmitted to bus arbiter 50 of FIG. 2. When service request 94 receives the bus grant, it produces a start signal which is transmitted to DMA controller 64. At this time, type manager 96 knows that it has control of the memory's data and address bus and of DMA controller 64. Type manager 96 is coupled to DMA controller 64 and to service request 94.

Type manager 96 then operates in the appropriate type mode to control the transfer of address information between the appropriate one of the buffer managers 98 and DMA controller 64. Type manager 96 activates the appropriate buffer manager 1–16. The appropriate buffer manager 1–16 of buffer managers 98 responds with the point or data to the type manager 96. Type manager 96 then loads the starting address to DMA controller 64 incremented by any offset address such as for a packet-type manager 3.

DMA controller 64 then is loaded with control information by type manager 96. DMA controller 64 then proceeds to affect the data packet transfer from the input buffers of I/P bus interface 30 to memory 20. As the data is being written, DMA controller 64 increments the input address and word count and control information within the appropriate one of the buffer pointers 1–16. When DMA controller 64 has completed the data transfer, it generates a DONE signal which is transmitted to service request 94 and to type manager 96. The DONE signal is also transmitted from DMA controller 64 to arbiter 62. In response to the DONE signal, arbiter 62 allows the next highest priority data transfer to occur. In response to the DONE signal, service request 94 clears its previous bus request and grant with bus arbiter 50. In this way, bus arbiter 50 may allow other requestors to utilize the address and data busses. Lastly, the DONE signal indicates to type manager 96 that the data transfer is complete and that it may release the last used buffer manager after performing any adjustment of the input and output pointers which must incremented to point to the next sequential location in the appropriate area of memory 20.

As an example of a data transfer between the memory and K-band modem interface 43, a data transfer of this type will be explained. A data packet is to be transmitted to K-band modem interface 43 from another processor. Buffer number 12 is the target for this data packet since this is the buffer for K-band cross link output. The buffer type associated with buffer 12 is type 2 which indicates a circular buffer. The data packet is transferred from the other processor to a FIFO within the I/P bus interface 30. The first 4 bits of the global address format are the computer or processor number which is to receive the data. The next 4 bits are the buffer number which identify the buffer to be accessed. Since this is a K-band cross link output, for example, buffer 12 will be indicated. This information is latched in latch 90. Arbiter 62 prioritizes among each of its inputs for access to memory 20. For the present example, it is assumed that the K-band cross link output buffer is the next item of priority. Buffer number decoder 68 decodes the buffer number and transmits it to type manager 96 and type number decoder 92. Type manager 96 then operates in the type 2 or circular buffer mode. In addition, type manager 96 fetches the input, starting, and ending addresses from the registers for buffer 12. Next buffer manager 96 generates a request for the busses via request bus lead through service request 94. Simultaneously, type manager 96 requests control of the DMA control 64 via the controls lead. When the prioritized request for bus control is granted through service request 94 to type manager 96, type manager 96 operates DMA controller 64 to load the input address the transfer data from the FIFO to the memory 20 at the input address. As DMA controller 64 transfers the data, each address generated is checked to determine whether it is within the bounds of the particular buffer. That is, each address would be checked so that it is between the starting address and the ending address. After the last data word is written into memory 20, the address is incremented by one to point to the next sequential location where subsequent data packets will be stored. Again, in addition, this address is checked against the boundaries of the starting and ending address of the particular buffer. This incremented address is then written into the input address register of buffer 12. When the data transfers complete, DMA controller indicates so to type manager 96, service request 94, and to arbiter 62 so that other memory access requests may be processed.

As can be seen from the above explanation, the type manager provides for controlling a number of different buffer types. So that a unique manager is not needed for each different buffer type and that there is no requirement to interconnect these type managers to avoid the need for another level of arbitration among them for access to the memory. Since the type manager is readily adaptable to be implemented with hardware, high speed data transfers between processors are possible due to the high speed of hardware controllers versus the need for software intervention of a processor controlled operation. As a result, the throughput of data packets between processors or between processors and modem interfaces is greatly increased. This is of extreme importance in applications which are real time sensitive such as the transmission of communication information among satellites or between satellites and earth-bound stations or between satellites and a multiplicity of satellite users.

Figure 6:
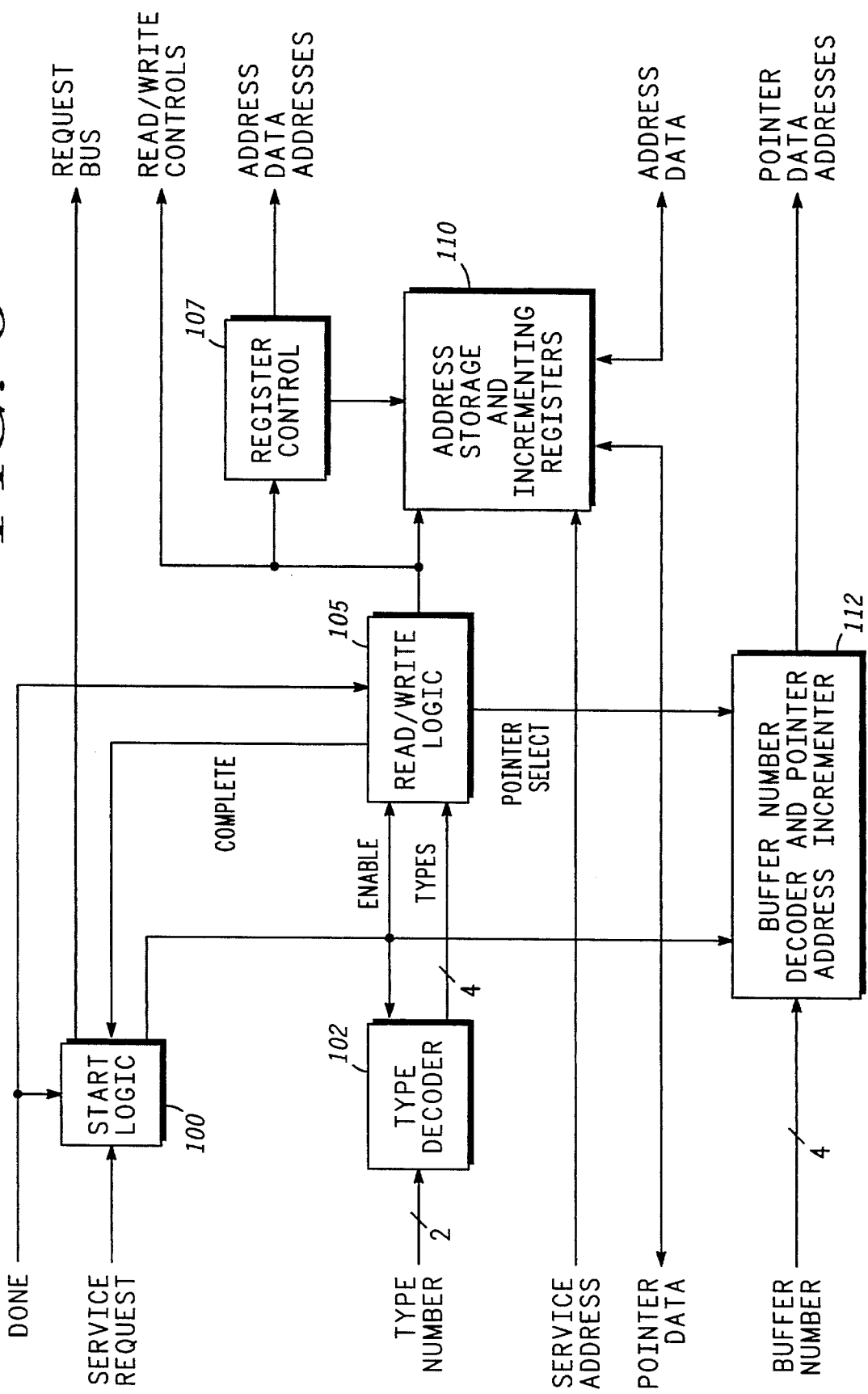
FIG. 6 is a block diagram of a packet type manager of FIG. 2.

FIG. 6 depicts a block diagram of the type manager 96 of FIG. 5. Start logic 100 is coupled to arbiter 62 via the service request lead, DMA controller 64 via the DONE lead to type decoder 102 and to read/write logic 105. When initiated with a service request, start logic 100 produces the request bus signal which is transmitted to service request 94. When the data transfer is complete, read/write logic 105 resets start logic 100 via the COMPLETE lead.

Type decoder 102 converts the type number to a set of four decoded types which are transmitted to read/write logic 105. In addition, start logic generates an enable signal which is transmitted to read/write logic 105.

Start logic 100 is connected to buffer number, decoder, and pointer address incrementer 112. Read/write logic 105 is coupled to buffer decoder 112. In addition, buffer decoder 112 receives the buffer number from buffer number decoder 68. Buffer number decoder 112 selects the appropriate start address from the selected buffer number and transmits this pointer address to DMA controller 64 via the pointer data address's lead.

Address storage and incrementing registers 110 are coupled to arbiter 62 via the services address's lead and to buffer managers 98 via the pointer data lead. Along with control information with read/write logic 105 and the selected buffer pointer, address storage and incrementing registers 110 produces the data address transmitted to DMA controller 64 which indicates the location for the data packet to be stored. Register control 107 performs the address control and incrementing and is coupled to DMA controller 64 via the address data address's bus Although the preferred embodiment of the invention has been illustrated, and that form described in detail, it will be readily apparent to those skilled in the art that various modifications may be made therein without departing from the spirit of the invention or from the scope of the appended claims.

What is claimed is:

1. In a packet data switching system including a plurality of processors and a plurality of input/output devices, each of said plurality of processors and said plurality of input/output devices for receiving and for transmitting data packets, said packet data switching system comprising:

means for receiving and transmitting said data packets;

memory means coupled to said means for receiving and transmitting;

processor means coupled to said memory means;

DMA controller means for controlling access to said memory means by said processor means and by said means for receiving and transmitting for transferring said data packets, said DMA controller means coupled to said memory means;

a plurality of buffer manager means coupled to said DMA controller means, each of said plurality of buffer managers means controlling the storage and retrieval of said data packets in said memory means via said DMA controller means;

buffer type manager means coupled to said plurality of said buffer manager means and to said DMA controller means, said buffer type manager means for selectively enabling each of said plurality of buffer manager means; and service arbitration means coupled to said buffer type manager means, to said DMA controller means, and to said means for receiving and transmitting, said service arbitration means for controlling access to said DMA controller by said plurality of buffer manager means.

2. A packet data switching system as claimed in claim 1, wherein said plurality of buffer manager means includes means for managing a linear buffer including a starting buffer address register, an ending buffer address register, a data packet input address register and a word count, and control register.

3. A packet data switching system as claimed in claim 1, wherein said plurality of buffer manager means includes means for managing a circular buffer including a starting buffer address register, an ending buffer address register, an input data packet address register, an output data packet address register, and a word count and control register.

4. A packet data switching system as claimed in claim 1, wherein said plurality of buffer manager means includes means for managing a base plus local offset buffer including a starting buffer address register, an ending buffer address register, and a word count and control register.

5. A packet data switching system as claimed in claim 1, wherein said plurality of buffer manager means further includes means for managing a base plus global offset including a starting buffer address register, an ending buffer address register, and a word count and control register.

6. A packet data switching system as claimed in claim 1, wherein there is further included bus arbitration means including address bus means and data bus means; said address bus means being coupled to said memory means, to said processor means, to said DMA controller means, and to said means for receiving and transmitting; said data bus means being coupled to said memory means, to said processor means, and to said means for receiving and transmitting; said bus arbitration means for controlling access to said memory means by said processor means and said service arbitration means.

7. A packet data switching system as claimed in claim 1, wherein said buffer type manager means includes:

start logic means coupled to said service arbitration means, said start logic means for requesting access to said memory means for a selected one of said plurality of buffer manager means;

means for converting buffer number to type number, said means for converting buffer number to type number coupled to said means for receiving and transmitting;

type decoder means coupled to said means for converting buffer number to type number and to said start logic means, said type decoder means for selecting the proper one of said plurality of buffer manager means.

8. A packet data switching system as claimed in claim 7, wherein said buffer type manager means further includes read/write logic means coupled to said start logic means, to said type decoder means, to said means for converting buffer number to type number, and to said DMA controller means, said read/write logic means providing control signals and address signals for said DMA controller means.

9. A packet data switching system as claimed in claim 8, wherein said buffer type manager means further includes register means coupled between said read/write logic means and said DMA controller means, said register means for storing and forwarding an address of said data packets in said memory means; and address storage/incrementing means coupled to said register means to said read/write logic means and to said DMA controller means, said address storage/incrementing means providing an address of a data packet is to be transferred from said memory means and incrementing said address for sequential accesses to said memory means.

10. A data packet transfer method for transferring data packets among a plurality of processors and a plurality of input/output devices, said data packet transfer method comprising the steps of:

providing a plurality of distinct types of buffer managers for controlling the transmission of a data packet to and from a memory;

selecting one buffer manager at a time of the plurality of distinct types of buffer managers based upon a buffer number transmitted within the data packet;

requesting control of the memory; said step of requesting control of the memory includes the step of requesting service from the DMA controller;

receiving/transmitting a plurality of data packets to and from the processors and to and from the input/output devices;

arbitrating requests for access to address and data busses of the memory among the processors, the plurality of input/output devices, and the DMA controller; and transferring the data packet to/from the memory based upon parameters included in the selected buffer manager.

11. A data packet transfer method as claimed in claim 10, wherein there is further included the steps of:

arbitrating among a plurality of requests for services to store and retrieve the plurality data packets to and from the memory.

12. A data packet transfer method as claimed in claim 11, wherein there is further included the step of storing each of the plurality of data packets into a first-in/first-out buffer device.

13. A data packet transfer method as claimed in claim 12, wherein there is further included the steps of:

determining the appropriate buffer type from a buffer number included in each data packet; and indicating an error, if the buffer type is invalid.

14. A data packet transfer method as claimed in claim 13, wherein said step of selecting a buffer manager includes the step of accessing the selected buffer manager by a buffer type manager to read/write a data packet from/to memory.

15. A data packet transfer method as claimed in claim 10, wherein the step of requesting control of the memory further includes the steps of:

determining whether access to the DMA controller has been granted; and repeating the step of determining whether access to the DMA controller has been granted until access to the DMA controller is granted.

16. A data packet transfer method as claimed in claim 15, wherein there is further included the step of updating pointers included in the buffer manager to point to the next sequential address in the memory to read data from or to write data to.

* * * * *